(12) United States Patent
Beers et al.

(10) Patent No.: US 7,984,178 B2
(45) Date of Patent: **\*Jul. 19, 2011**

(54) SYNTHETIC BRIDGING FOR NETWORKS

(75) Inventors: Ted W Beers, Corvallis, OR (US); Mark E Gorzynski, Corvallis, OR (US); William C Wickes, Corvallis, OR (US); Jon A Brewster, Monmouth, OR (US); Garrett Daniel Gargan, Corvallis, OR (US); Jeffrey L Thielman, Corvallis, OR (US); Scott Grasley, Lebanon, OR (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/762,927

(22) Filed: Apr. 19, 2010

(65) Prior Publication Data

US 2010/0205319 A1    Aug. 12, 2010

Related U.S. Application Data

(63) Continuation of application No. 11/911,496, filed on Oct. 12, 2007, now Pat. No. 7,730,200.

(60) Provisional application No. 60/894,802, filed on Mar. 14, 2007.

(51) Int. Cl.
*G06F 15/16* (2006.01)
(52) U.S. Cl. ............... 709/231; 709/229; 709/249
(58) Field of Classification Search .................. 709/223, 709/229, 231, 232, 249
See application file for complete search history.

(56) References Cited

U.S. PATENT DOCUMENTS

| | | | |
|---|---|---|---|
| 4,831,620 A | 5/1989 | Conway | |
| 5,374,952 A | 12/1994 | Flohr | |
| 5,515,511 A | 5/1996 | Nguyen et al. | |
| 5,844,600 A | 12/1998 | Kerr | |
| 5,859,852 A | 1/1999 | Moura et al. | |
| 5,968,176 A | 10/1999 | Nessett et al. | |
| 5,974,449 A | 10/1999 | Chang et al. | |
| 5,999,966 A | 12/1999 | McDougall et al. | |
| 6,047,325 A | 4/2000 | Jain et al. | |
| 6,262,978 B1 | 7/2001 | Bruno et al. | |
| 6,389,550 B1 * | 5/2002 | Carter | 709/229 |
| 6,496,862 B1 | 12/2002 | Akatsu et al. | |
| 6,584,493 B1 | 6/2003 | Butler | |

(Continued)

FOREIGN PATENT DOCUMENTS

EP    0 817 484 A    1/1998

(Continued)

OTHER PUBLICATIONS

ISDN to IP Videoconferencing Migration http://www.yorktel.com/site/Portats/0/Migration/WhitePaper.pdf.

(Continued)

*Primary Examiner* — Ramy M Osman

(57) ABSTRACT

An apparatus has a content node to logically select a first A/V stream from an application layer of a first network and a collaboration node to logically select a second A/V stream from an application layer of a second network. A set of non-network media link interfaces are configured to transmit the second A/V stream from the collaboration node to the content node, and to transmit the first A/V stream from content node to the collaboration node. The non-network media link interfaces provide for limited information encoding to prevent network protocol information from being transferred between the first and second networks.

20 Claims, 6 Drawing Sheets

U.S. PATENT DOCUMENTS

| | | | |
|---|---|---|---|
| 6,590,603 | B2 | 7/2003 | Sheldon et al. |
| 6,697,476 | B1 | 2/2004 | O'Malley et al. |
| 6,704,873 | B1 | 3/2004 | Underwood |
| 6,748,420 | B1 | 6/2004 | Quatrano et al. |
| 6,781,601 | B2 | 8/2004 | Cheung |
| 6,816,462 | B1 | 11/2004 | Booth, III et al. |
| 6,831,899 | B1 | 12/2004 | Roy |
| 6,862,622 | B2 | 3/2005 | Jorgensen |
| 6,901,448 | B2 | 5/2005 | Zhu et al. |
| 6,928,070 | B2 | 8/2005 | Emerson, III |
| 6,961,416 | B1 | 11/2005 | Summers et al. |
| 7,043,528 | B2 | 5/2006 | Schmitt et al. |
| 7,062,025 | B2 | 6/2006 | Summers et al. |
| 7,120,139 | B1 | 10/2006 | Kung et al. |
| 7,133,514 | B1 | 11/2006 | Cook et al. |
| 7,373,414 | B2 | 5/2008 | Evron et al. |
| 7,730,200 | B2 * | 6/2010 | Beers et al. .................. 709/231 |
| 2002/0031131 | A1 | 3/2002 | Yemini et al. |
| 2002/0107923 | A1 | 8/2002 | Chu et al. |
| 2003/0023873 | A1 | 1/2003 | Ben-Itzhak |
| 2003/0081112 | A1 | 5/2003 | Sheldon et al. |
| 2003/0142662 | A1 | 7/2003 | Mahajan |
| 2004/0032881 | A1 | 2/2004 | Arai |
| 2004/0047342 | A1 | 3/2004 | Gavish et al. |
| 2004/0162871 | A1 | 8/2004 | Pabla et al. |
| 2004/0210674 | A1 | 10/2004 | Gbadegesin |
| 2005/0021620 | A1 | 1/2005 | Simon et al. |
| 2005/0024487 | A1 | 2/2005 | Chen |
| 2005/0089052 | A1 | 4/2005 | Chen et al. |
| 2005/0094578 | A1 | 5/2005 | Pasha et al. |
| 2005/0117605 | A1 | 6/2005 | Yan et al. |
| 2005/0213739 | A1 | 9/2005 | Rodman et al. |
| 2005/0226172 | A1 | 10/2005 | Richardson et al. |
| 2005/0243742 | A1 | 11/2005 | Hansen |
| 2005/0283536 | A1 | 12/2005 | Swanson et al. |
| 2006/0020715 | A1 | 1/2006 | Jungck |
| 2006/0047749 | A1 | 3/2006 | Davis et al. |
| 2006/0047750 | A1 | 3/2006 | Schmitt et al. |
| 2006/0233527 | A1 * | 10/2006 | Murata et al. .................. 386/95 |
| 2006/0238648 | A1 | 10/2006 | Wogsberg |
| 2006/0239294 | A1 | 10/2006 | Wogsberg |
| 2007/0050448 | A1 | 3/2007 | Gonen et al. |
| 2007/0101024 | A1 | 5/2007 | Doumuki et al. |
| 2007/0162753 | A1 | 7/2007 | Nakano et al. |
| 2008/0304486 | A1 * | 12/2008 | Graessley et al. ............ 370/392 |

FOREIGN PATENT DOCUMENTS

| | | |
|---|---|---|
| WO | 02/05908 A | 3/2002 |
| WO | WO-2003/009563 A1 | 1/2003 |

OTHER PUBLICATIONS

Secure Video conferencing for web Based Security Surveillance System http://www.security.iitk.ac.in/contents/repository/more/gurmeet.pdf.

A Video Gateway to Support Video Streaming to Mobile Clients http://whitepapers.techrepublic.com.com/whitepaper.aspx?docid=175156.

Vian Cooper, "Video Over BPON with Integrated VDSL", Fujitsu Sci. Tech. V.37(1), pp. 87-96.

Volker Bendzuweit, "Tradition und Moderne beim Triple Play over SDH", Nachrichtentechnische Zeitschrift Ntz Heft Feb. 2006.

Unknown, "Merlin AM-1", Aug. 16, 2007, www.atecom.com.

York Telecom, ISDN to IP Videoconferencing Migration, Jan. 2003, accessible from http://whitepapers.zdnet.co.uk/0,1000000651,260081421p.00.htm on Jan. 20, 2010.

Shukla, Anaradha, Global IP Solutions Releases GIPS LSVX Video Codex, Mar. 23, 2007, accessible from http://ipcommunications.tmonetcom/hot-topics/video/articles/5864-global-ip-solutions-releases-gips-lsvx-video-codec.htm/content.aspx on Jan. 20, 2010.

Singh, Gurmeet, Secure Video Conferencing for Web Based Security Surveillance System, Jul. 2006, accessible from http://www.security.iitk.ac.in/contents/repository/more/gurmeet.pdf on Jan. 20, 2010.

Metters, Jens et al., A Video Gateway to Support Video Streaming to Mobile Clients, Oct. 1997, accessible from http://www.kn-s.dir.de/People/Strang/summit97b.ps on Jan. 20, 2010.

Wainhouse Research, Security for Videoconferencing: A Guide to Understanding, Planning, and Implementing Secure Compliant ISDA & IP Videoconferencing Solutions, Jan. 2004, accessible from http://www.cityis.com/assets/downloads/securityforvideocon.pdf on Jan. 20, 2010.

Chen, et al, "ATMS Switching Systems", 1995, ISBN 0-89006-685-5, 7 pages.

DARPA. "Internet Protocol", Request for Comments (RFC) 791, Sep. 1981, 51 pages.

Schuitzrinne, H., et al. "RTP.: A Transport Protocol for Real-Time Applications", Request for Comments (RFC) 3550, Jul. 2003, 89 Pages.

Non-Final Office Action Mailed Nov. 24, 2009. US Appl. No. 11/911,499, 24 pages.

Great Britian Search and Exampination Report Mailed Jan. 21, 2008. GB Appln No. 0720427.4, 5 pages.

A video Gateway to Support Video Streaming to Mobile Clients rittp.iiwhitecapors techrepubiic.cier3.comMhitepaperaspx?docid-175.

* cited by examiner ion. Furthermore, like reference numerals designate corresponding similar parts through the several views.

SYNTHETIC BRIDGING FOR NETWORKS

CROSS REFERENCE TO RELATED APPLICATIONS

This application is a continuation of U.S. patent Ser. No. 11/911,496 filed Oct. 12, 2007, now U.S. Pat. No. 7,730,200 entitled "Synthetic Bridging for Networks" which claims the benefit of U.S. Provisional Application No. 60/894,802, filed Mar. 14, 2007, which is hereby incorporated by reference in its entirety, and which is related to and claims the benefit of co-pending U.S. patent Ser. No. 11/911,499, entitled "Connecting Collaboration Nodes", filed concurrently on Jul. 31, 2007, and is hereby incorporated by reference in its entirety.

BACKGROUND

Businesses are requiring more agility in how they design and develop new products and services. With the ever expanding global economy, these businesses are requiring that knowledge be transferred and leveraged from across their organization or partners no matter where their or their partner's employees are located in the world. However, the need for protection of any knowledge shared becomes ever the more important as the free flow of capital, knowledge, and people across national borders limits the ability of businesses to take remedial legal action to protect against intellectual property theft of the transferred knowledge. Thus, to remain competitive around the globe, businesses must become more proactive in protecting their people and intellectual property from competitors and others who wish to damage world's economic system.

However, building large information technology (IT) departments to support the collaboration of ideas across geographical boundaries is especially difficult due to the need to have a large diverse IT workforce that can understand the language, culture, and intimacies of various foreign IT departments within their own companies. This difficulty is further complicated when IT departments from various companies must come to agreement on how to share data over separate and secure corporate data networks. Using a general purpose IT path such as the Internet exposes the business's intellectual property to unknown threats and also opens the possibility of outside attack to the corporate network by unknown or known hackers. Often times, the sheer inertia of trying to get the IT departments of two different companies to agree to firewall and other network protocols in sharing data between their two data networks prevents the desired collaboration from even taking place. Thus, most IT departments require a customized IT path between different network sites that requires agreement between different IT departments to setup and administer.

Accordingly, a new approach to providing a demonstrateably secure way to exchange data between different groups within and between businesses across the world is needed while protecting and insulating network infrastructures of the various businesses. Preferably this new approach can be achieved by the necessary collaborating groups with little or no IT department involvement, once the new approach is setup and approved. Thus, there is a need for a secure, reliable knowledge transport between two or more global sites that do not require a customized IT path between the sites' data networks.

BRIEF DESCRIPTION OF THE DRAWINGS

The invention is better understood with reference to the following drawings. The elements of the drawings are not necessarily to scale relative to each other. Rather, emphasis has instead been placed upon clearly illustrating the invention. Furthermore, like reference numerals designate corresponding similar parts through the several views.

DETAILED DESCRIPTION

Figure 1:
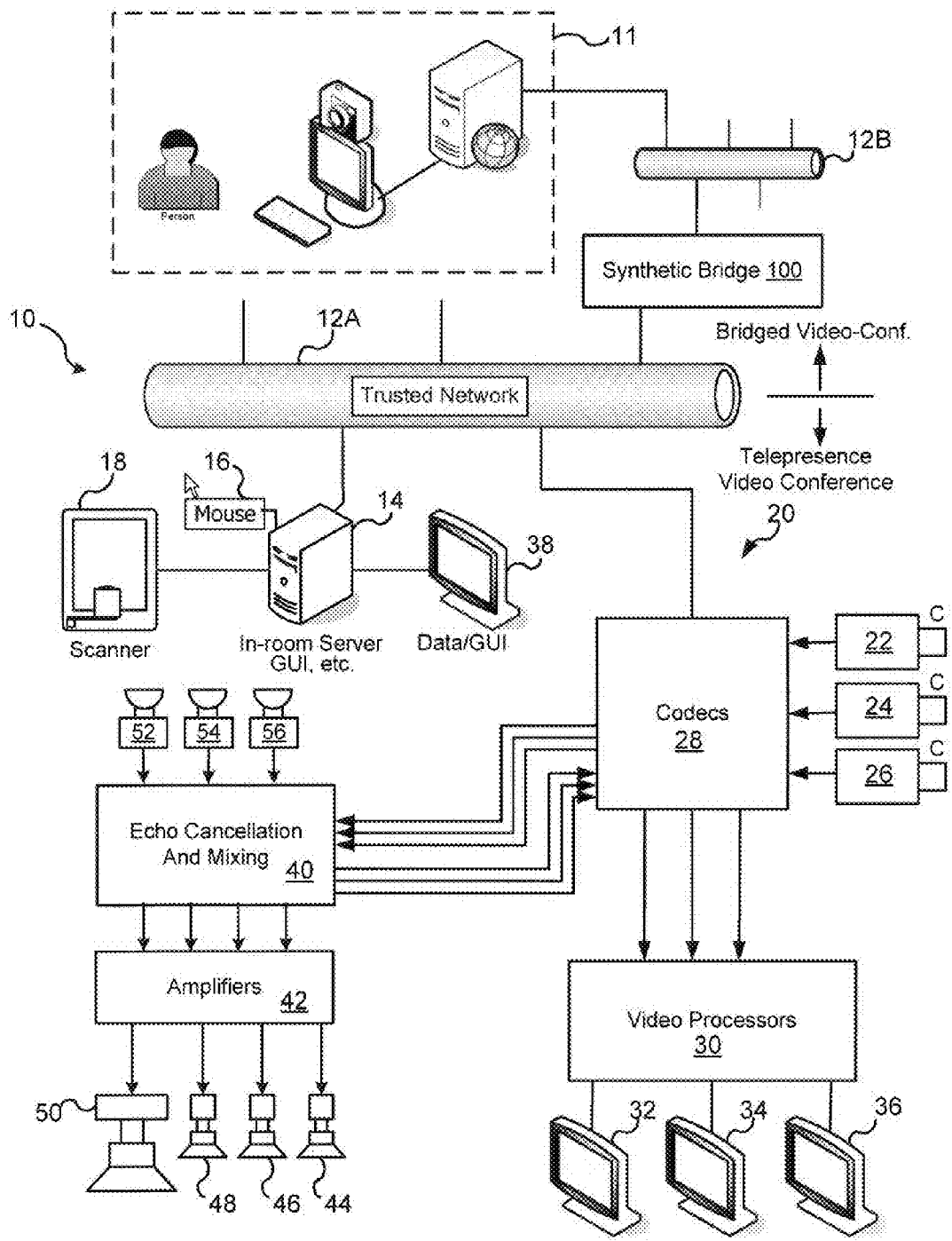
FIG. 1 is an exemplary embodiment of a telepresence video-conferencing system incorporating a Synthetic Bridge.

It should be noted that the drawings are not true to scale. Further, various parts of the disclosed elements have not been drawn to scale. Certain dimensions have been exaggerated in relation to other dimensions in order to provide a clearer illustration and understanding of the present invention.

Moreover, while the present invention is illustrated by preferred embodiments, it is not intended that these illustration be a limitation on the scope or applicability of the present invention. It is not intended that the present invention be limited to the physical, electrical, or logical structures illustrated. These structures are included to demonstrate the utility and application of the present invention to presently presented preferred embodiments. For instance, while audio/video (A/V) data streams are highlighted as being more typical of the data streams encountered by most collaborative embodiments of the invention, any data stream regardless of whether its purpose is for audio, video, control, or other purpose is envisioned as being encompassed by the invention.

This description describes an inherently secure data bridge (herein defined as a "Synthetic Bridge") between two separate secure networks thus providing a "transport" mechanism for collaboration and other media data streams. The Synthetic Bridge allows for the protection and insulation between collaboration session attendee's network infrastructures and associated media resources. The Synthetic Bridge provides for transporting data streams such as Audio/Visual (A/V) media into and out of collaborative sessions, i.e., a videoconference. However, any data and non-network related application control content, such as control signals to drive a computer application remotely, between two sites can be shared in general over the Synthetic Bridge. Embodiments of the invention include a specially designed and trusted collaboration transport (herein a c-tran network) network connecting two or more content nodes. One of the content nodes may be connected to a network separate and different than the c-tran network and which accordingly may be untrusted to the users of the trusted c-tran network. Each content node is connected to a collaboration node which interfaces the content node to the c-tran network.

The c-tran network may provide for quality of service guarantees, extended reach throughout the world, improved performance in terms of bandwidth and low latencies, and other additional value relative to the individual networks connected via the Synthetic Bridge.

The collaboration node may include connectors to provide for data input into and out of the collaboration node as well as connectors to provide for non-network related application control gear input into and out of the collaboration node. The collaboration node may include an encoding and decoding mechanism for translating the collaboration data and control data to and from the c-tran network format. The collaboration node also may also include connectors for connection to the c-tran network. Several additional items may be connect to or present in a collaboration node allow for enhanced collaboration capabilities. These additional items may be "collaboration media" such as cameras, microphones, speakers and video screens or integrated A/V gear such as a collaboration studio, for instance a "Halo studio" offered by Hewlett-Packard Co. as just one example.

This synthetic bridge has several advantages over prior art network gateways, switches, bridges, or firewalls which are traditionally used to provide similar interfacing between different networks. The Synthetic Bridge allows for a demonstrably and understandably secure transfer of collaboration media streams between networks. The Synthetic Bridge may also allow a customized or Internet IP connection between the networks for non-network related application control. The Synthetic Bridge may provide a collaboration environment customization mechanism for use by, e.g. A/V integrators, for more efficient flexible customization of a desired collaboration environment without the need for IT support on a continuing use basis. In addition to virtual network interoperability, the Synthetic Bridge may include additional features, such as translation services, to allow for collaborative sessions that are incompatible in their session management standards or media stream formats.

Before discussing the unique aspects and design of the Synthetic Bridge, some discussion and definition of traditional networks and their terms are in order to better see the unique value proposition of the Synthetic Bridge and the various opportunities it presents.

Definition of Network Terms

Most people are familiar with the Internet that connects various corporate networks together and allows for individuals to access other computers or servers connected to the Internet by having these individuals access through a network provider. The Internet, per se, is more of a collection of software "network protocols" that are communicated over one or more hardware "networks." Several different hardware networks exit but the Ethernet is the most popular local area network (LAN) implemented worldwide that itself has several software protocols to define how data is organized for transport. However, even the Ethernet takes many physical forms of transmission medium such as twisted pair, fiber-optic cable, or co-axial cable. The various transmission mediums are connected using "hubs," "gateways," "bridges," or "switches." Various data devices or hosts (such as computers, servers, and peripherals) are connected to each other with the various transmission medium using the hubs, gateways, bridges, or switches. The various transmission mediums may operate at different data rates. Thus, the hubs, gateways, bridges, and switches are used to interconnect the various data rates, software protocols, and transmission mediums between separate networks to form the overall Internet.

To deal with network interoperability, the International Organization for Standardization (ISO) developed its Open Systems Interconnection (OSI) networking suite which includes an abstract model of networking (the 7-layer model) and a set of concrete proposals. While the Internet does not follow exactly the 7-layer model, its development was influenced by it. The 7-layer model divides the networking system into layers which allows one or more entities to implement the layer's assigned functionality. An entity may combine one or more layer's assigned functionality.

Each entity interacts directly only with the layer immediately beneath it, and provides facilities for use by the layer above it. Software protocols enable an entity in one data device to interact with a corresponding entity at the same layer in another data device via the bridge, gateway, or switches. Layer 1 is the physical layer. This layer defines all the electrical and physical specifications for devices. This layer defines what cables, coax, fiber optics, or wireless protocols will be used.

Layer 2 is the data link layer and is often called the Ethernet layer. This layer provides the functional and procedural techniques to transfer data between network entities and to detect and possibly correct errors that may occur in Layer 1. This layer is traditionally the layer at which bridges and switches operate.

Layer 3 is the network layer and is often called the Internet Protocol (IP) layer. This layer provides the functional and procedural techniques of transferring variable length data sequences from a source to a destination via one or more networks while maintaining the quality of service requested by Layer 4, the transport layer. This Layer 3 performs network routing functions, thus traditionally this layer is where routers operate to send data throughout an extended network.

Layer 4 is the transport layer and is often called the TCP (Transmission Control Protocol) layer. This layer provides transparent transfer of data between end users, thus relieving the upper layers from any concern while providing reliable data transfer. This layer keeps track of packets of data and retransmits those that fail.

Layer 5 is the session layer and is often called the control layer. This layer controls the sessions between computers. The layer creates, manages, and ends the connections between local and remote applications.

Layer 6 is the presentation layer. This layer transforms data to provide a standard interface for the Application layer. Included in this layer are usually the compression and encryption/decryption functions as well as any other data manipulations required. Some of the other data manipulations may be ASCII to EBCDIC coded file translations.

Layer 7 is the Application layer. This layer provides a technique for a user to access information on the network through an application. Some standard application protocols to allow for communication between applications include file transfer protocol (FTP), simple mail transfer protocol (STMP), and hypertext transfer protocol (HTTP) used with web browsers.

Layers 4-7 are usually called Host Layers and Layers 1-3 are usually called Media Layers. Data transferred on an OSl network is usually broken up in terms of Data units for each layer and function. For instance, in Layer 1 (physical) the data is usually referred to in "bits" and represent the media, signal, and binary transmission functions. In Layer 2 (data link) the data is usually referred to as "frames" which allow for the function of physical addressing in the media access control (MAC) and logical link control (LLC) sub-layers of Layer 2. In Layer 3 (network) the data is usually referred to in terms of "packets" which provide the function of path determination and logical addressing for the internet protocol (IP). In Layer 4 (transport) the data is referred to in terms of "segments" which provide the functionality of end-to-end connections and reliability for the transmission control protocol (TCP). In Layers 5-7, the data is simply referred to as "data" and provides the functionality of interhost communication in the session layer, data representation and encryption in the presentation layer, and the network process to the application in the application layer. Network gateways can operate at any level of the OSI model from application layer to lower layers including the physical layer.

Note, however, that the TCP/IP architecture used in the Internet does not exactly follow the OSI model and there is industry disagreement on how it should be described with respect to the OSI layered model. In actual use, the Internet TCP/IP network protocol omits some features of the OSI model and combines other features of adjacent layers and splits other layers apart. When an application sends data to the network, each layer treats all of the information it receives from an upper layer as data and adds a header as control information to the front of the data and then passes it on the next lower layer. When a layer receives data from a lower layer, the layer processes and removes its header before passing the remaining data to the next upper layer.

The TCP/IP architecture in one model can be described as having 4 hybridized layers or entities: Application, Transport, Network, and Network Access. The Application Layer of TCP/IP groups the OSI Application, Presentation, and Session Layers. TCP/IP uses the terms "socket" and "ports" to describe the paths over which applications on host devices communicate. Most application level protocols are associated with one or more port numbers. The TCP/IP Transport Layer actually uses two network protocols to send/receive data which are both useful for different applications. The Transmission Control Protocol (TCP) guarantees information transmission. However, the User Datagram Protocol (UDP) transports datagrams without end-to-end checking. The Network Layer of the TCP/IP protocol has several network protocols of which the Internet Protocol (IP) and ICMP are the most important. All upper and lower layer communications must travel through the IP. The ICMP protocol is used to facilitate and manage the routing of packets through the network. The Network Access Layer groups the OSI Data Link and Physical Layers in the TCP/IP architecture. TCP/IP makes use of existing Data Link and Physical Layer standards rather than defining its own.

In order to span two separate networks, several different methods have been developed depending on the network's organization. Some examples are firewalls, bridges, gateways, switches, and routers.

A "firewall" is a security device implemented in hardware, software, firmware, or combination thereof that is configured to permit, deny, or proxy data connections. The firewall's basic task is to control traffic between networks that have different zones of trust. Often times a firewall is referred to as a "packet filter." To set up a firewall requires considerable understanding of complex network protocols and computer security and thus demand the considerable skill of a firewall administer to ensure proper configuration. Very small mistakes in the configuration can render a firewall worthless as a security tool.

A network "bridge" connects multiple segments at the data link layer (Layer 2 in the OSI Model, the Network Access Layer in the TCP/IP model). A bridge is different than a hub which simply rebroadcasts packets to adjacent network segments. A bridge manages traffic from one network to another by processing information from each frame of data received. For an Ethernet frame, this provides the MAC address of the frame's source and destination which are used to resolve the appropriate network segment that a MAC address belongs to. Two different methods are used to resolve how to route packets. "Transparent Bridging" uses a forwarding database to send frames across network segments. "Source Route Bridging" use two frame types, Single Route (SR) and All Route (AR) frames, to find the route to the destination network segment. The AR frames are used to find routes while the SR frames are used to route data once the route is known. When following the IEEE 802.1D standard, a network bridge is often referred to as a network switch. While network bridges allow for the access control and performance management between networks, they are extremely difficult to scale to large networks. Further, buffering of the data introduces store and forward delays which can become unpredictable over large networks making latency a difficult parameter to guarantee. Many times, the bridging of different MAC protocols introduces errors, thus requiring formal designation or specification of proper equipment to use on the network.

To deal with large network issues, one typically includes routers and bridging to perform data control. However, as experience has borne out on the Internet, Layer 3 (routers) and Layer 2 (bridges and switches) bridging are very weak in terms of security. Various forms of attacks such as MAC address spoofing, DHCP starvation, Spanning-tree protocol manipulation, VLAN hopping, and others have led to tough restrictions imposed by IT departments on how networks are set up and configured.

To successfully connect or "bridge" two networks, often a gateway is created from routers, bridges, and switches to act as an entrance to another network. A gateway is often associated with both a router that knows where to direct a given packet of data that arrives at the gateway, and a switch that furnishes the actual path in and out of the gateway for a given packet. In an enterprise corporate network, typically a computer server is used as a gateway node. This computer server is often also acting as a proxy server and a firewall server and thus its management is quite complex to setup and administer.

However, many applications, such as video-conferencing, require audio and visual streams from parties outside a corporate network in order to have real value. Therefore, the present invention provides methods and apparatuses for providing inherently secure data streams, such as audio and visual data streams, to application programs by bypassing the problems inherent in setting up and managing traditional network bridging.

Synthetic Bridging

The embodiments disclosed provide for this inherent security by a technique defined herein as "synthetic bridging." Synthetic bridging includes the following features:

a) a first method or device for extracting select data from the presentation or application layers of a first network which contain a desired set of first data stream(s) to be transported to a second network;

b) a second method or device for extracting select data from the presentation or application layers of the second network which contain a desired set of second data stream(s) to be transported to the first network, thus allowing for full duplex operation; and c) transporting the first and second data streams over a set of separate non-network related media link interfaces that only allow for limited information encoding and inherently prevent any information not in the sets of first and second data streams from being modified until after the first and second data streams are in the control of the opposite network from which they were transported.

"Limited information encoding" refers to forcing all information (data) in the respective data streams to be encoded into a limited non-network format and sent over a non-network media link interface that only accepts this limited format before being decoded from the limited format back to a format acceptable for network packets. For instance, in one embodiment, the information in the data stream from a first network is encoded from MPEG2 to a limited encoded RGB RS170 type video and sent over a non-network media link interface such as a VGA cable. The RGB RS170 type video is a limited format in that is inherently unable to carry network protocol or be manipulated by the network traffic on either the first or second network. The RGB RS170 signal may then be decoded back to MPEG2 or another video encoded format to allow for control by and integration into the second network for transport. In another embodiment, the limited information encoding may keep the data stream in digital format but encode it onto a different type of data bus (such as SDI, DVI, etc.) to provide the non-network media link interface which is not network related so as to inherently prevent transmission of network control or prevent any information not in the data stream from being modified until the data stream is in the control of the second network.

Of course, other features can be added to further increase the capability of the Synthetic Bridge. For instance, because only desired select data is extracted from the session, presentation, or application layers, an additional separate path independent from the data path can be provided to allow for application control or other application information to be transported to the second network. In addition, since all network related information from lower OSI or TCP/IP layers have been extracted from the select data, an additional interface may be provided to allow for directory services on the opposing network thus allowing for selection of where to obtain or route the first and second data streams. One approach to provide the directory or control services is to allow for only unidirectional control/directory services. One way in which this unidirectional control/directory services can be performed is to allow for the control/directory services to be provided via a separate path such as with email. In other words, a user at a site in the first network can send an email to a known email address that has proper authentication of senders. The email would contain information on what site on the second network is to be accessed and what data streams to receive and what the data stream to be sent is to be used. Another approach is to allow for a web site that can be accessed via appropriate password or biometric controls to configure a Synthetic Bridge.

In addition to the features of a single Synthetic Bridge, multiple Synthetic Bridges can be configurable in either a daisy chainable (serial) or star configuration. Accordingly, a bidirectional path of inherently secure data streams can be passed from a first network to a third network via a second network (i.e. a c-tran network) all while maintaining security and requiring minimal IT support to set up and configure.

To provide even further security and compatibility between networks and applications, the desired select data after being passed to the control of a second network from a first network can be encapsulated with hyper-data (such as with a collaboration description language) that describes what the purpose of the data stream is, what its format is, who owns it, and other relevant information which may be useful for different applications. As such, by having such an enhanced collaborative layer container around the select data streams, the data streams can be shared amongst different applications after various transformations are performed on the data streams using the encapsulated hyper-data. More detail about these features of various embodiments is described further in relation to the attached drawings and their description which follows.

FIG. 1 is an exemplary embodiment of a bridged video-conferencing system 10 that shares information such as video, audio, and other data streams over a non-Internet trusted network 12A (the c-tran network). The Internet, really a network protocol operated on various private and public networks, is not considered a trusted network even though it is used for collaboration purposes at times. A telepresence video-conferencing system 20 may include several different video streams such as those from cameras 22, 24, 26 and those going to video monitors 32, 34, 36. Also included are audio data streams from microphones 52, 54, 56 and to speakers 44, 46, 48 and sub-woofer 50. Additional data streams may be transported over the trusted network 12A such as from a local overhead scanner 18 or to a data monitor 38 via an in-room server 14. The server 14 may perform other tasks such as providing a graphical user interface (GUI) on data monitor 38. The GUI allows for simple set up and operation of a video-conference as well as directory services and other tasks. The server 14 can be controlled readily by local participants with a mouse 16 using the GUI interface.

The audio data streams to and from the telepresence video-conference system 20 can be mixed and processed to reduce echoes and can allow for adaptation to room acoustics using echo cancellation and mixing circuitry 40. The speaker's sound clarity can be improved through the use of amplifiers 32 which also allows for better directionality by providing for separation of bass tones to sub-woofer 50 and higher tones to speakers 44, 46, and 48. All video and audio streams can be compressed, encrypted, decrypted, decompressed, reformatted, or converted to different formats using codec circuitry 28.

While trusted network 12A allows the telepresence video-conference system 20 to be interfaced with other similar video-conferencing systems 20 that are on the trusted network 12A, there are other types of video-conferencing systems 11 which some people or companies would like to share information between and with telepresence video-conferencing system 20. However, these other video-conferencing systems 11 typically reside on corporate intranets or other private and public networks 12B which may not be trusted by users on trusted network 12A, thus making 12B an untrusted network. Further, while users on network 12B may actually trust each other, they may not have sufficient knowledge of persons on trusted network 12A and thus to those users on network 12B, trusted network 12A may be also perceived as untrusted to them.

Accordingly, the embodiments described within allow for cross-connecting two or more different collaborative sessions on different networks in a demonstrably secure fashion to provide secure, reliable transport among two or more sites. These embodiments eliminate the need for a traditional private or untrusted Internet path between the site's networks. That is, rather than provide for a traditional IP switch, bridge, or router which operates at lower levels (2-4) of the OSI framework, the invention provides a "Synthetic Bridge" 100 between networks 12A and 12B for application data streams. This Synthetic Bridge 100 strips and thus prevents all network protocols (such as IP protocols) from being shared between the networks while allowing the application data streams and application related control to be transported. Inherent security is provided in part by logical selection of the data streams (using hardware, software or combinations thereof) and by limited information encoding of the data streams that allows them to pass over a non-network media link interface which physically cannot allow any network protocol information to pass between the networks. Further, in some embodiments, the non-network media link interface is only compatible with transporting the application data streams. For instance, a non-network media link interface for a video data stream is an analog video link which is incapable of carrying network protocol information. A second non-network media link for an analog data stream may be an analog audio cable which is not capable of carrying network protocol information. Thus, by using conventional media link interfaces to carry the data streams that are inherently incapable of carrying network protocol information, the security is demonstrably secure.

The trusted network 12A may be a dedicated application network such as a c-tran network and not a general purpose network protocol like the Internet which operates on various public and private networks. Network 12A is designed specifically to optimize high bandwidth with low latency to be able to transport live, interactive, audio, video, and other data rich media streams. Preferably the network 12A has a smallest link of 45 Mbps to avoid any significant serialization delay. To keep latency minimized, a very flat network topology is utilized. In order to keep a high quality end-user experience, the total one-way latency between two sites is kept to less than one-quarter of a second. This total latency encompasses all aspects of encoding/decoding, encapsulation/de-encapsulation, capture and presentation, filtering, processing, compression and decompression and transport latencies across the transmission path. As each component's contribution to overall latency decreases (as technology improves), the length of the "reach" of where different sites can be physically located is increased.

To better preserve the shortest paths capable of reliable delivery with little packet loss, bandwidth and network resource mechanisms are used to insure high-quality sessions for the duration of the session. As most traffic streams are presumed to take place linking a pair or small number of end sites together for any given session, there is little presumption of session pre-emption once authorized sessions commence.

Some longer latency and/or loss tolerant sessions may be provided over the network. Such services include directory, presence, messaging, credential verification, and time/name services for examples.

The interior of the network concentrates on speedy delivery of traffic flows. Any access control, encryption/decryption and other proxy services, if needed occur at the edge of the network such as in Synthetic Bridge 100 and not the interior of the network 12A. This design tends to keep core backbone of the network 12A simpler to grow, maintain, stable, and very fast.

Figure 2:
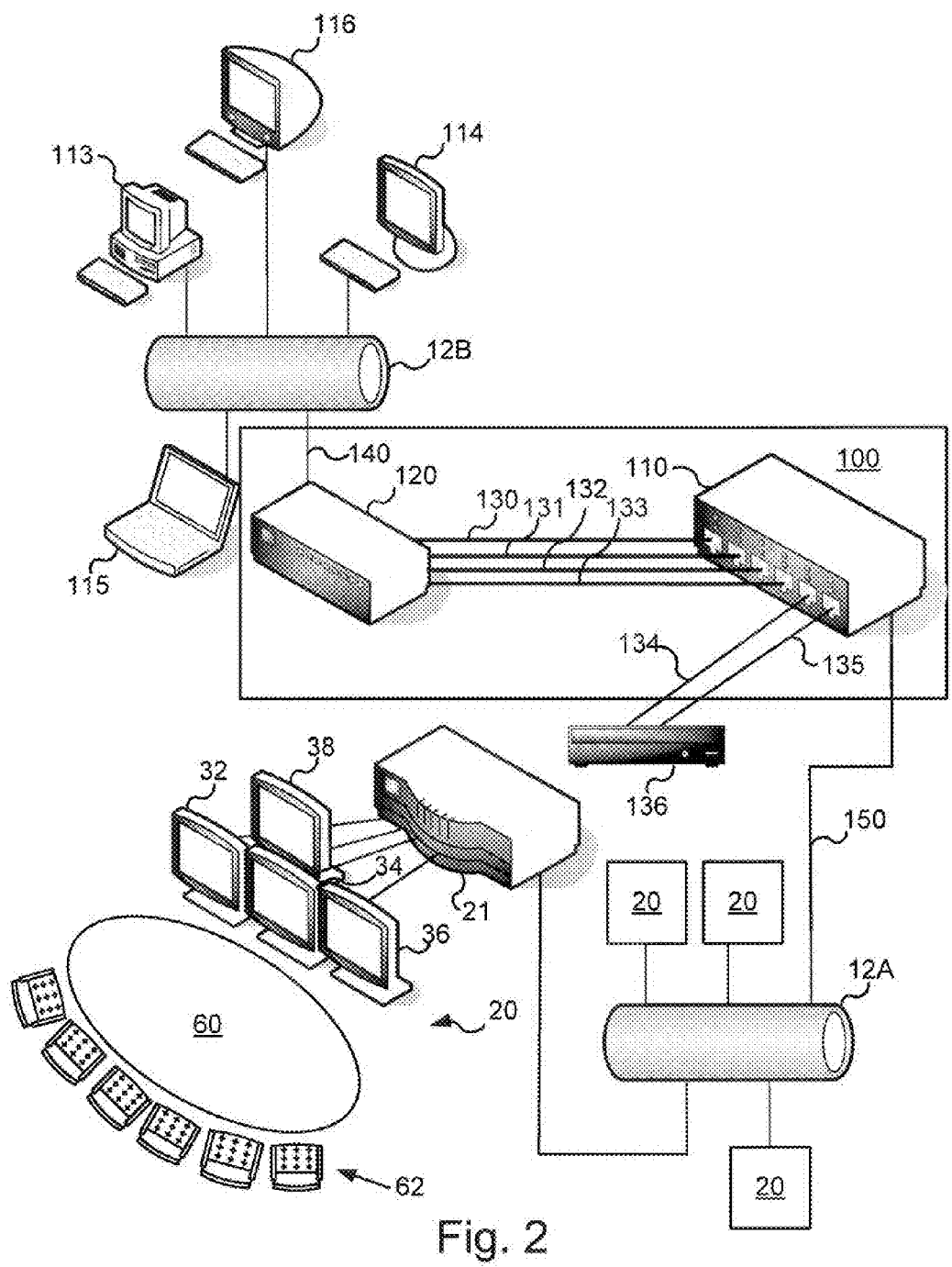
FIG. 2 is an exemplary design of an embodiment illustrating one approach to implementing Synthetic Bridge.

FIG. 2 is an exemplary design of an embodiment illustrating one approach to implementing Synthetic Bridge 100. In this embodiment, Synthetic Bridge 100 has three main components, content node 120, a set of non-network media link interfaces 130-135, and collaboration node 110.

The content node 120 is connected to network 128 such as with a leased line 140 (i.e., a T3, optical, cable, or wireless high speed link) which provides a large data pipe to and from content node 120. Although network 12B may be connected to various collaboration type products such as video-conferencing devices, video games, interactive screens, and telepresence systems, a few representative but not limiting examples are shown. For instance, a mobile device 115 with an embedded webcam (not shown) is connected to network 12B via a wired, optical, or wireless connection. Also shown are an IBM™ compatible personal computer 113, an Apple™ computer 116, such as an IMac™ with built-in web conferencing and a dedicated personal video-conferencing system 114.

The collaboration node 110 is connected to trusted network 12A. Trusted network 12A is further connected to other video-conferencing systems (VCS) 20. VCS 20 may be a telepresence system as shown in one exploded view. VCS 20 includes an interface rack 21 that connects to video monitors 32, 34, 36 and collaboration screen/GUI interface 38. Other connection such as audio, cameras, and other collaboration tools are omitted for brevity. The video monitors are arranged in such a manner around conference table 60 and chairs 62 to allow for gaze awareness and a full immersion feeling.

The set of non-network media link interfaces 130-135 allow for only limited encoded information to be transported between content node 120 and collaboration node 110. In this particular embodiment, four non-network media link interfaces 130-133 are used to transport two video streams in opposite directions and two audio streams in opposite directions, however, any number of non-network media link interfaces may be present. Also shown is the ability to share other data such as video and audio content from a DVD, HD-DVD™, Blu-ray™, or other optical media player. Of course, other A/V equipment or other high and low bandwidth devices can be connected via the non-network media link interfaces which provide for limited information encoding to enable inherent security to the networks.

Figure 3:
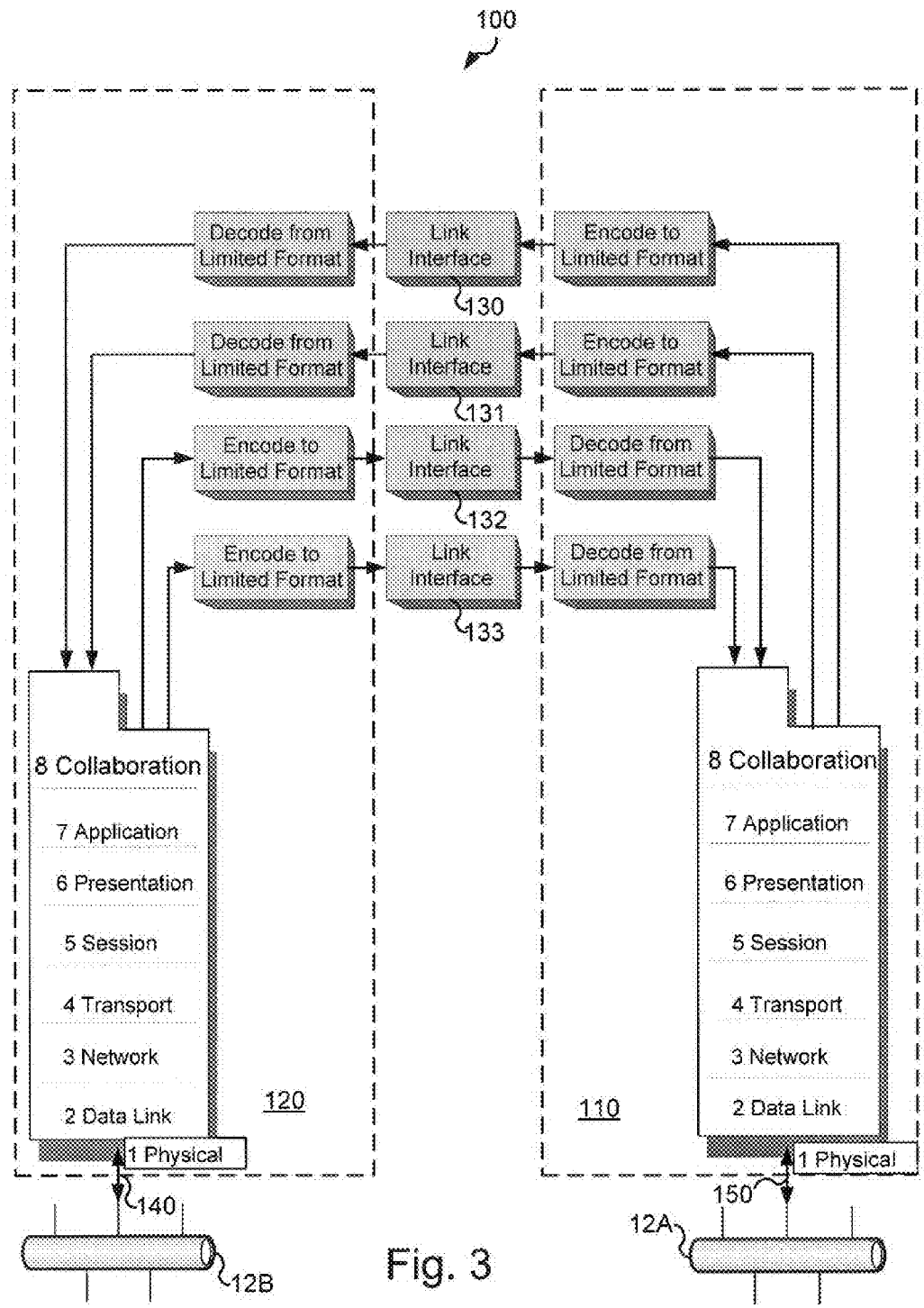
FIG. 3 is one exemplary embodiment of a Synthetic Bridge with content node and collaboration node devices that provide interfaces to their respective networks.

FIG. 3 is one exemplary embodiment of a Synthetic Bridge 100 with content node 120 and collaboration node 110 being devices that provide OSI model stack interlaces to their respective networks 12B and 12A to the set of non-network media link interfaces 130-133. While only four non-network media link interfaces are shown, any number of non-network media link interfaces can be provided.

Content node 120 receives content from network 12B over the physical layer, such as an Ethernet connection including leased line 140, such as a T3 connection, although any other physical types are possible. Conventionally, data exchanged between two close networks would take place at Layer 2 or the Data Link layer in the OSI model when using a bridge or switch device. If the distance between the two networks is large, then routing of the data at the OSI model Level 3 is conventionally done with a router. However, the past practices of forming a data link at these levels has traditionally and continues to be fraught with concern over security to prevent viruses, Trojans, denial of service, and other network attacks from occurring. Thus it is difficult to effectively bridge two separate networks locally or distantly without a tremendous amount of IT support when using the conventional techniques at the Level 2 and Level 3 layers of the OSI model or programming firewalls with gateways.

Contrarily, in this embodiment of a Synthetic Bridge, the data streams of interest are allowed to transit through the OSI model Layers 1-7 (or IP layers 1-4 depending on how it is described as noted previously) before reaching a "Collaboration Layer" or "Level 8 Layer" which allows for data stream extraction or transfer to the Layer 7 Application. In addition to A/V data streams, data streams in the form of application control can also be passed between Level 8 and Level 7 Layers. Other information that can be passed is data which describes the format, size, encoding, content, use, restrictions, etc. that apply to each of the data streams to be transported to the other network 12A. This other information can be limited encoded and transported on a non-network media link interface to maintain inherent security. By selectively logically filtering or selecting desired application A/V and application control data streams from the Application Layer and limited encoding them for the non-network media link interfaces, all network protocol information such as MAC addresses. IP addresses, ports, and routing information is prevented from being transferred to the other network 12A. By using non-network media link interfaces in addition to the logical selection, the network protocol data cannot be modified serendipitously by viruses, Trojans, or other rouge programs from the other network. Therefore, the Synthetic Bridge 100 is a combination of hardware, software/firmware that removes all network protocol information before transferring application data over an inherently secure set of non-network media link interfaces.

To help provide additional trust by a company's IT department, the content node 120 can be supplied by, controlled by, pre-configured, or inspected by the IT department to ensure that only desired data streams are transported by Collaboration Layer 8 to the non-network media link interfaces. However, significant ongoing IT support is not required. Ideally, the media streams are logically selected from the output of the Application without any modification of the Application. Thus the Collaboration Layer 8 can be added independently of existing applications, thereby making it more likely that security is maintained.

Additionally to help protect the encryption/decryption system used on network 12B, the Collaboration Layer 8 can also be used to provide for decryption of encrypted data streams before presenting them to the set of non-network media link interfaces 130-133 to further heighten security. Thus, not only are network protocols not transferred with the data streams, but also no public or private keys are needed to be transferred to allow for downstream decryption of the data streams at receiving sites. The collaboration node 110 after receiving the decrypted data stream from content node 120 may add its own encoding before presenting the data stream for transport on network 12A. Similarly on reverse data streams transferred from the collaboration node 110 to the content node 120, collaboration node 110 can also remove its encoding (if present) and pass a decoded data stream to content node 120 which would then add its own encoding in Collaboration Layer 8 before presenting the data stream to network 12B. Again there would be no need to share encryption keys between networks thus allowing for heightened trust and greater security between networks 12A and 12B.

While both content node 120 and collaboration node 110 are shown as abstract blocks implementing the various functions of the OSI Layers, those of ordinary skill in the art will realize that these functions can be implemented with logical circuitry using hardware or memory programmed to execute computer readable instructions on a processing unit or a combination thereof.

The set of non-network media link interfaces can be implemented using any combination of conventional standard digital and analog interfaces such as DVI, HDMI, ROB RS170, VGA, etc. or the like. In addition, a custom non-network media link interface can be implemented to provide further security by designing it so it cannot be tapped into without authorized physical access. However, since no network protocol information is being transferred over the non-network media link interface, the most one with unauthorized access could achieve is disruption, monitoring, or substitution or the data stream. These actions would not affect the routing of the data stream as that is handled by trusted network 12A.

Collaboration node 110 functions similarly as described for content mode 120 but provides its services for applications which are transported on trusted network 12A. Collaboration node 110 communicates over a second high bandwidth leased line 150 or other high speed interface such as an optical cable into network 12A. Also, while FIG. 3 illustrates a symmetric flow of information between content node 120 and collaboration node 110, the flow of information may be asymmetric. For instance, collaboration node 110 may provide more A/V data streams to content node 120 than it receives. As an example of bridging a telepresence system to a single video-conferencing workstation, the content node 120 may provide a single audio and a single video data stream. However, the collaboration note 110 may provide three video and one audio data streams for its local meeting site and additional three video and one audio stream for the combined meeting along with a collaboration A/V link such as for a DVD player or other A/V gear.

In summary, the synthetic bridge includes a set of non-network media link interfaces connecting between a content node and a collaboration node. The content node includes circuitry to extract select data from an application layer of a first network. The select data contains a set of first data streams without network protocol to be transported to a second network. The content node also includes circuitry to receive a set of limited encoded second data streams to be incorporated into the application layer of the first network and circuitry to limited encode the set of first data streams onto the set of non-network media link interfaces.

The collaboration includes circuitry to extract select data from an application layer of the second network which contains a set of second data streams without network protocol to be transported to the first network. The collaboration node also includes circuitry to receive a set of limited encoded first data streams to be incorporated into the application layer of the second network and circuitry to limited encode the set of second data streams onto the set of non-network media link interfaces.

Figure 4:
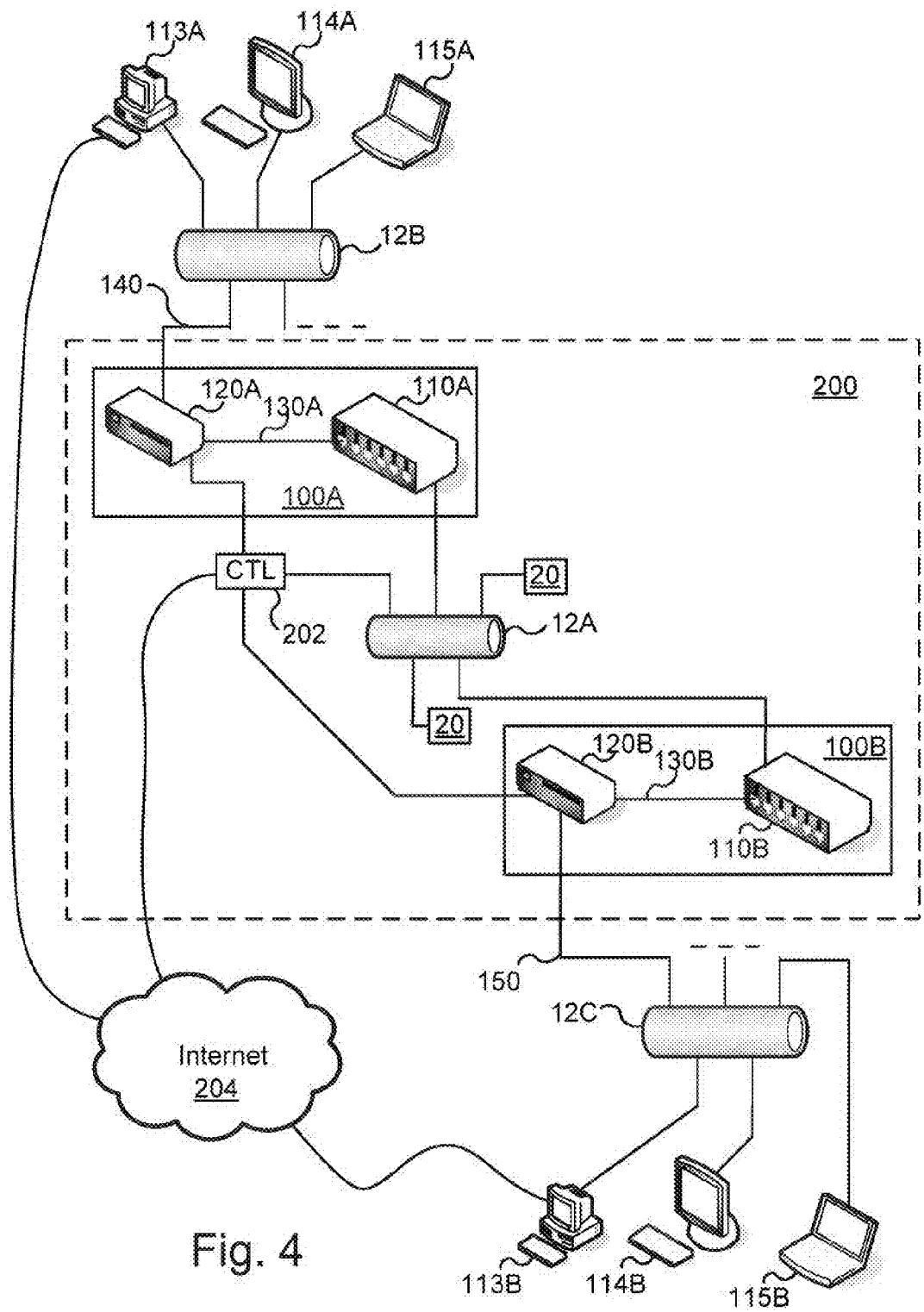
FIG. 4 is an exemplary block diagram of an embodiment of a "spanning Synthetic Bridge" that incorporates two Synthetic Bridges coupled to a trusted collaboration network in a daisy-chained fashion.

FIG. 4 is an exemplary block diagram of an embodiment of a "Spanning Synthetic Bridge" 200 which incorporates two Synthetic Bridges 100A and 100B coupled to a trusted network 12A in a daisy-chained fashion. This Synthetic Bridge 200 allows for additional flexibility and long distance remote connections. Another feature available if desired is remote control of the Synthetic Bridge 200.

In this embodiment a first network 12B is connected to computer 113A, VCS 114A and mobile device 115A. Again, any of the connections can be wired, optical, or wireless as desired. A second network 12C can be similarly configured with similar computer 113B, VCS 114B, and mobile device 115B.

In this arrangement at least one of the devices on the first network 12B, the second network 12C, or the trusted network 12A or any combination thereof, can access a control interface 202 of Synthetic Bridge 200. The control interface can be done manually, directly connected, or connected through the Internet 204 as shown in FIG. 4. The control interface 202 can be command driven, a graphical user interface (GUI), a menu selection, or able to accept remote commands or any combination thereof. One additional option for control via the Internet is through commands sent via email. This approach allows for additional filtering of received commands to ensure they came from reputable and authorized sources. Additionally, the GUI can be presented over a web page interface to control interface 202.

Spanning Synthetic Bridge 200 includes a trusted network 12A and first Synthetic Bridge 100A and second Synthetic Bridge 100B. Trusted network 12A may include one or more video-conferencing sites 20. In addition, control of the spanning Synthetic Bridge 200 may be provided by a separate control interface 202 which may be server based for example. Control interface 202 may allow for manual input such as with a GUI interface 38 and mouse 16 (see FIG. 1) or it may connect to another shared network such as the Internet 204 as shown. The control interface 202 may include signals to allow the trusted network 12A to configure various connections for collaboration between devices on networks 12A-C.

First Synthetic Bridge 100A includes a first control node 120A and a first collaboration node 110A to interface with network 12B and trusted network 12A, respectively. The first content node 120A and first collaboration node 110A are interconnected with at least one first non-network media link interface 130A over which limited encoded signals are transported.

Second Synthetic Bridge 100B is similarly built as is first Synthetic Bridge 100A, however, it is programmed or otherwise designed to interface network 12C with trusted network 12A. Second content node 120B is connected to network 12C via a dedicated line such as leased line 150 and thus is able to be remotely located from network 12C. Second collaboration node 110B is connected to network 12A and to second content node 120B via at least one second non-network media link interface 130B.

Content nodes 120A and 120B can be programmed or otherwise configured to translate incoming A/V streams into a standard limited encoding and sent over respective non-network media link interfaces 130A and 130B to collaboration nodes 110A and 110B, respectively. Collaboration nodes 110A and 110B can then translate or re-encode the received standard limited encoding into a special collaboration format that is recognized by other collaboration nodes 110 that may reside on the trusted network 12A. Similarly, special collaboration formatted A/V streams received by collaboration notes 110A and 110B can be converted to a standard limited encoded format and transported over non-network media link interfaces 130A and 130B, respectively, and then translated or re-encoded to a required format for respective networks 12B and 12C.

Accordingly, by providing for limited encoded formatting and transporting over a non-network media link interface, collaboration nodes 110A and 110B and content nodes 120A and 120B can provide translation services on the various data streams to ensure inter-operability without compromising encryption security. Because Synthetic Bridges 100A and 100B provide for inherent security to trusted network 12A, the spanning Synthetic Bridge 200 also provides for network isolation and a high level of security.

Figure 5:
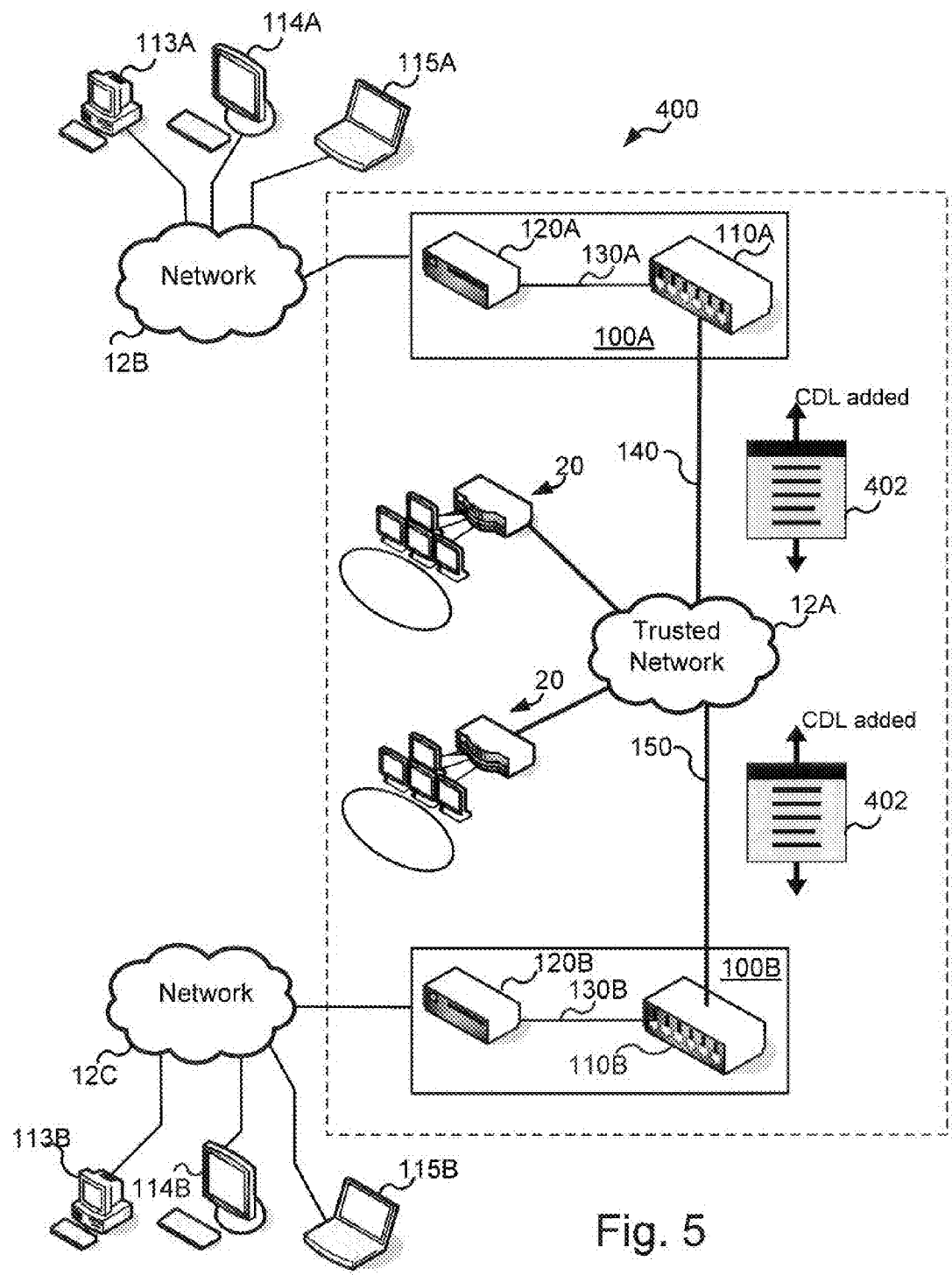
FIG. 5 is an exemplary block diagram of an embodiment of a spanning Synthetic Bridge that incorporates an additional or alternative feature to the spanning Synthetic Bridge in FIG. 4.

FIG. 5 is an exemplary block diagram of an embodiment of a spanning Synthetic Bridge 400 that incorporates an additional or alternative feature to the spanning Synthetic Bridge 200 in FIG. 4. In this embodiment, collaboration nodes 110A and 110B include logic to add a "collaboration description language" (CDL) information to the transported data streams to encapsulate them and allow other collaboration nodes 110 on the trusted network 12A to better process the data streams. The CDL consists of information that is different than the network protocol headers which normally accompany data streams through a network. Rather than containing MAC addresses and destination IP addresses and ports, the CDL describes the encapsulated data stream in terms of its underlining properties to allow for easier and faster decoding, encoding, converting, or modification of the data streams to allow them to be adapted to differing A/V or other systems connected to networks 12A-C. For instance, with a video stream, the CDL might describe the video format, its relation to other video/audio streams such as time synchronization data or correlation (for telepresence or multi-conference) to other video streams, the color format and bit depth, the compression standard used, the encryption technology used, the owner of the stream, the physical location of where the stream originated, the time zone from where the stream originated, what angle the camera captured the video, the camera's zoom factor, who the participant(s) are in the video, and other parameters about the content and format of the video stream which may be useful to other collaboration nodes. The CDL may appear once at the beginning of transport of the video stream across trusted network 12A or it may be sent periodically to allow for re-synchronization of A/V streams if there are network difficulties. The CDL may also be broken up such that some session related information is transmitted at the beginning of the data stream session and other real-time related information is transmitted with individual packets. The CDL may also be used with public/private key transmission to ensure that encapsulated CDL encoded streams can only be received by the respective collaboration node 110 to further ensure high security.

The CDL can be added to encapsulate the data stream in the content node 120 or alternatively in the collaboration node 110. The information in the CDL can be pre-configured for each session and/or adapted in real time as a VCS session progresses.

Figure 6:
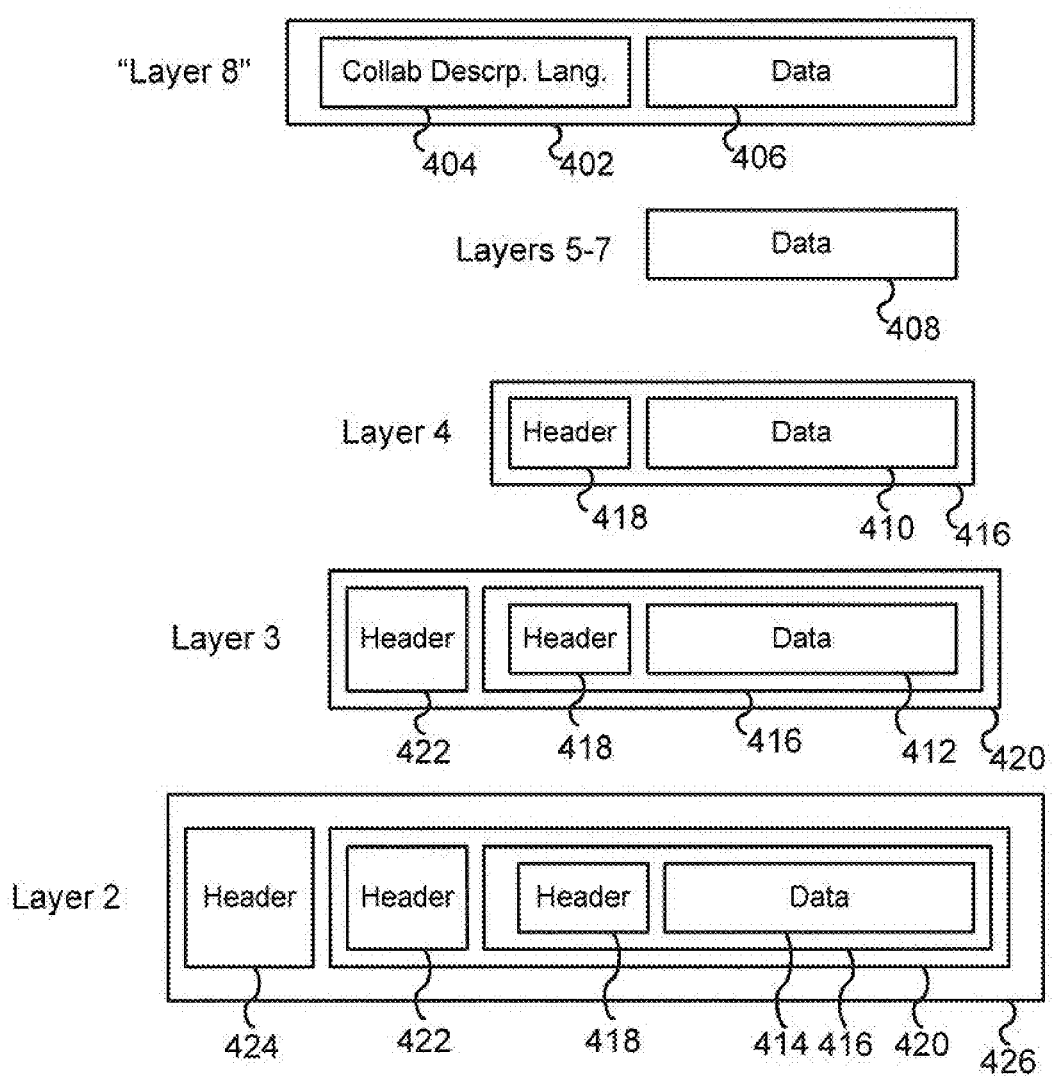
FIG. 6 is an abstract representation of network packets showing the removal of header information from lower OSI model layers as the packets progress up the OSI model stack.

FIG. 6 is an abstract representation of network packets showing the removal of header information from lower OSI model layers as the packets progress up the OSI model stack. For instance, in Layer 2, a data link packet 426 includes a first header 424 and a Network layer data packet 420 which encapsulates a data packet 414 which is a piece of a larger data stream. Additional header information used in upper layers of the OSI model stack such as second header 422 and third header 418 are shown encapsulated in the first data packet 420. After Layer 2 strips first header 424 from the data link packet 426, the Network layer packet 420 including Network data packet 412 is transferred to Layer 3 of the OSI model stack. Layer 3 strips second header 422 and passes Transport layer packet 416 to Layer 4 of the OSI model stack. Layer 4 strips third header 418 and performs any decryption or other processing on the Transport layer data packet 410 before passing on the Session layer data packet 408 to Layer 5 of the OSI model stack. This Session layer data packet 408 can be used in the Session, Presentation, and Application (Layers 5-7) of the OSI Model Stack as required. Information from a desired data stream is removed from the Session layer data packet 408 in Layers 5-7 and passed to the Layer 8 (Collaboration Layer) which may translate, encode, convert, format, or otherwise manipulate a collaboration layer data packet 406 to present to the trusted network. In one embodiment, the CDL information 404 is attached to the collaboration layer data packet 406 to create a trusted network collaboration packet 402 for transport over network 12A.

Likewise, trusted network collaboration packets 402 which are received by Layer 8 strip the CDL packet 404 and use the information to translate, decode, re-convert, re-format, or otherwise manipulate the collaboration layer data packet 406 to create a Session layer data packet 408 for use on a receiving device, such as a video-conferencing system. The Session layer data packet 408 is passed down the OSI model stack and network protocol information such as first, second, and third headers 424, 422, 418 are added to create a data link network packet 426 to be transported over a network to the receiving device.

While the present invention has been particularly shown and described with reference to the foregoing preferred and alternative embodiments, those skilled in the art will understand that many variations may be made therein without departing from the spirit and scope of the invention as defined in the following claims. This description of the invention should be understood to include all novel and non-obvious combinations of elements described herein, and claims may be presented in this or a later application to any novel and non-obvious combination of these elements. The foregoing embodiments are illustrative, and no single feature or element is essential to all possible combinations that may be claimed in this or a later application. Where the claims recite "a" or "a first" element of the equivalent thereof, such claims should be understood to include incorporation of one or more such elements, neither requiring nor excluding two or more such elements.

What is claimed is:

1. An apparatus, comprising:
   a content node to logically select a first A/V stream from an application layer of one or more first data streams of a first network;
   a collaboration node to logically select a second A/V stream from an application layer of one or more second data streams of a second network; and
   a set of non-network media link interfaces to transmit the second A/V stream from the collaboration node to the content node, and to transmit the first A/V stream from content node to the collaboration node, wherein the non-network media link interfaces provide for limited information encoding to prevent network protocol information from being transferred between the first and second networks.

2. The apparatus of claim 1, wherein the collaboration node is configured to provides services to an application on the second network including at least one of directory, presence, messaging, credential verification, time, and name services.

3. The apparatus of claim 1, wherein the content node further comprises:
   circuitry to extract select data from the application layer of the one or more first data streams of the first network; and
   circuitry to receive the second A/V stream for incorporation into the application layer of the one or more first data streams of the first network.

4. The apparatus of claim 1, wherein the collaboration node further comprises:
   circuitry to extract select data from the application layer of the one or more second data streams of the second network; and
   circuitry to receive the first A/V stream for incorporation into the application layer of the one or more second data streams of the second network.

5. The apparatus of claim 1, wherein the collaboration node further is configured to add a collaboration description language to encapsulate the first A/V stream.

6. The apparatus of claim 5, wherein the collaboration description language is used to describe the first A/V stream in terms of it underlining properties to allow for faster implementation of one or more of decoding, encoding, converting, or modification of the first A/V stream.

7. The apparatus of claim 5, wherein the collaboration description language is used to adapt the first A/V stream to an A/V format of the second A/V stream.

8. The apparatus of claim 7, wherein the collaboration description language describes the first A/V stream in at least one of the group of video format, time synchronization, correlation, color format, bit depth, compression standard, and encryption technology.

9. The apparatus of claim 5, wherein the collaboration description language is used to describe the content of the first A/V stream.

10. The apparatus of claim 9, wherein the collaboration description language describes for the first A/V stream at least one of the group of owner, physical location origin, time zone origin, angle of camera capture, camera zoom factor, and participants.

11. The apparatus of claim 5 wherein the collaboration description language is sent periodically to allow for re-synchronization of the first and second A/V streams.

12. The apparatus of claim 5 wherein the collaboration description language is broken up into session related information transmitted at a beginning of the first A/V stream and real-time related information transmitted in individual packets of the first A/V stream.

13. The apparatus of claim 5 wherein the collaboration description language is pre-configured for each session.

14. The apparatus of claim 5 wherein the collaboration description language is adaptable in real time.

15. The apparatus of claim 5 wherein the collaboration description language allows the first A/V stream and the second A/V stream to be shared between different applications on the first network and the second network.

16. The apparatus of claim 1 wherein at least one of the first network and the second network is the Internet.

17. The apparatus of claim 1 wherein at least one of the first network and the second network is a trusted network that concentrates on speedy delivery of traffic flows on its interior wherein a total one-way latency is kept to less than one quarter of a second.

18. The apparatus of claim 1 wherein the apparatus allows for the cross-connecting of two or more different collaborative sessions on different networks in a demonstratively secure fashion without modification of a application on one or both of the first or second networks.

19. The apparatus of claim 1 wherein the logically select of the first and second A/V streams is done using hardware, software, or combinations thereof.

20. The apparatus of claim 1 wherein the set of non-network media link interfaces are designed to not be tapped into without authorized physical access.

* * * * *